US012546940B2

(12) United States Patent
Tambasco

(10) Patent No.: US 12,546,940 B2
(45) Date of Patent: Feb. 10, 2026

(54) CROSSOVER STRUCTURE FOR OPTICAL WAVEGUIDES

(71) Applicant: Cisco Technology, Inc., San Jose, CA (US)

(72) Inventor: Jean-Luc J. Tambasco, Macungie, PA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 18/361,751

(22) Filed: Jul. 28, 2023

(65) Prior Publication Data

US 2025/0035841 A1 Jan. 30, 2025

(51) Int. Cl.
*G02B 6/12* (2006.01)
*G02B 6/125* (2006.01)

(52) U.S. Cl.
CPC .... *G02B 6/125* (2013.01); *G02B 2006/12119* (2013.01); *G02B 2006/12147* (2013.01)

(58) Field of Classification Search
CPC .......... G02B 6/125; G02B 2006/12119; G02B 2006/12147
USPC .......................................................... 385/14
See application file for complete search history.

(56) References Cited

U.S. PATENT DOCUMENTS

| | | | |
|---|---|---|---|
| 11,275,210 B1 * | 3/2022 | Thompson | G02F 1/3132 |
| 11,294,119 B1 | 4/2022 | Bruck et al. | |
| 11,360,268 B1 | 6/2022 | Ling et al. | |
| 2016/0341896 A1 | 11/2016 | Horth et al. | |
| 2017/0146751 A1 | 5/2017 | Sutherland | |
| 2020/0371288 A1 | 11/2020 | Barwicz | |

OTHER PUBLICATIONS

Wu, S.; Mu, X.; Cheng, L.; Mao, S.; Fu, H.Y. State-of-the-Art and Perspectives on Silicon Waveguide Crossings: A Review. Micromachines 2020, 11, 326. <https://doi.org/10.3390/mi11030326>.
Wesley D. Sacher, Jared C. Mikkelsen, Patrick Dumais, Jia Jiang, Dominic Goodwill, Xianshu Luo, Ying Huang, Yisu Yang, Antoine Bois, Patrick Guo-Qiang Lo, Eric Bernier, and Joyce K. S. Poon, "Tri-layer silicon nitride-on-silicon photonic platform for ultra-low-loss crossings and interlayer transitions," Opt. Express 25, 30862-30875 (2017).

(Continued)

*Primary Examiner* — Jerry M Blevins
(74) *Attorney, Agent, or Firm* — Patterson + Sheridan, LLP

(57) ABSTRACT

The present disclosure describes a crossover structure for an optical circuit and a method of operating the optical circuit. The optical circuit includes a first layer, a second layer, a first waveguide positioned in the first layer, and a second waveguide positioned in the second layer. The second waveguide includes a first section, a second section, and a third section. When viewed along an axis normal to the first layer and the second layer, the first section is positioned on a first side of the first waveguide, the third section is positioned on a second side of the first waveguide, and the second section overlaps with the first waveguide. A first rate of change of a first angle between the second section and the first waveguide varies across a length of the second section.

16 Claims, 6 Drawing Sheets

(56) References Cited

OTHER PUBLICATIONS

Kuanping Shang, Shibnath Pathak, Binbin Guan, Guangyao Liu, and S. J. B. Yoo, "Low-loss compact multilayer silicon nitride platform for 3D photonic integrated circuits," Opt. Express 23, 21334-21342 (2015).

Adam M. Jones, Christopher T. DeRose, Anthony L. Lentine, Douglas C. Trotter, Andrew L. Starbuck, and Robert A. Norwood, "Ultra-low crosstalk, CMOS compatible waveguide crossings for densely integrated photonic interconnection networks," Opt. Express 21, 12002-12013 (2013).

Jeff Chiles, Sonia Buckley, Nima Nader, Sae Woo Nam, Richard P. Mirin, and Jeffrey M. Shainline, "Multi-planar amorphous silicon photonics with compact interplanar couplers, cross talk mitigation, and low crossing loss", APL Photonics 2, 116101 (2017) <https://doi.org/10.1063/1.5000384>.

\* cited by examiner

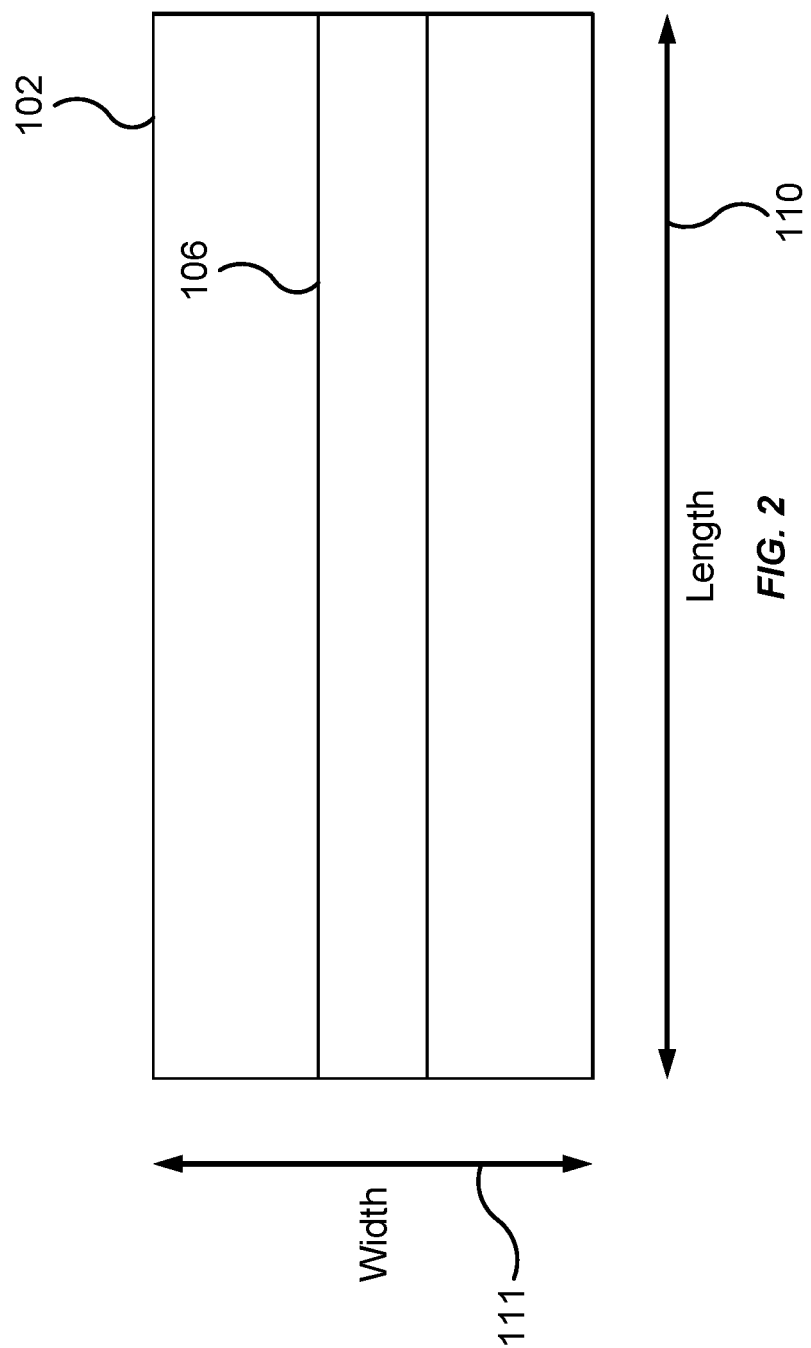

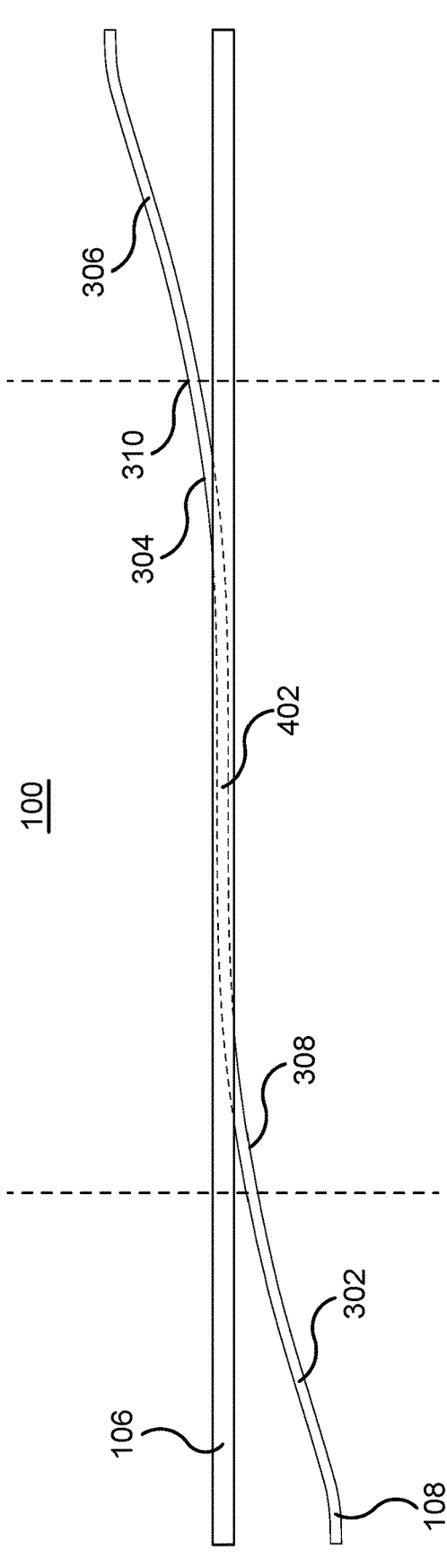
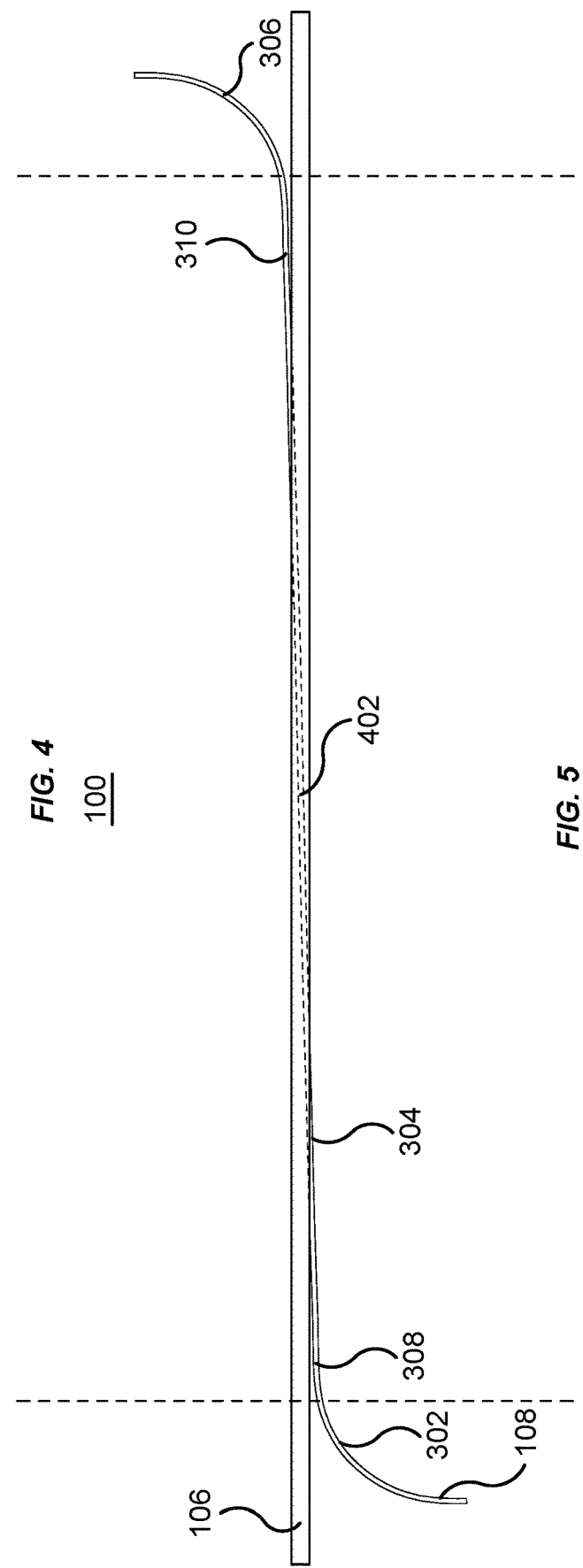

CROSSOVER STRUCTURE FOR OPTICAL WAVEGUIDES

TECHNICAL FIELD

Embodiments presented in this disclosure generally relate to optical devices and circuits. More specifically, embodiments disclosed herein relate to a crossover structure for optical waveguides.

BACKGROUND

Optical circuits and devices are used to communicate optical signals. These circuits and devices may include waveguides that carry the optical signals to different points in the circuits and devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 2 illustrates an example layer in the system of FIG. 1.

FIG. 4 illustrates an example top-down view of the system of FIG. 1.

FIG. 5 illustrates an example top-down view of the system of FIG. 1.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
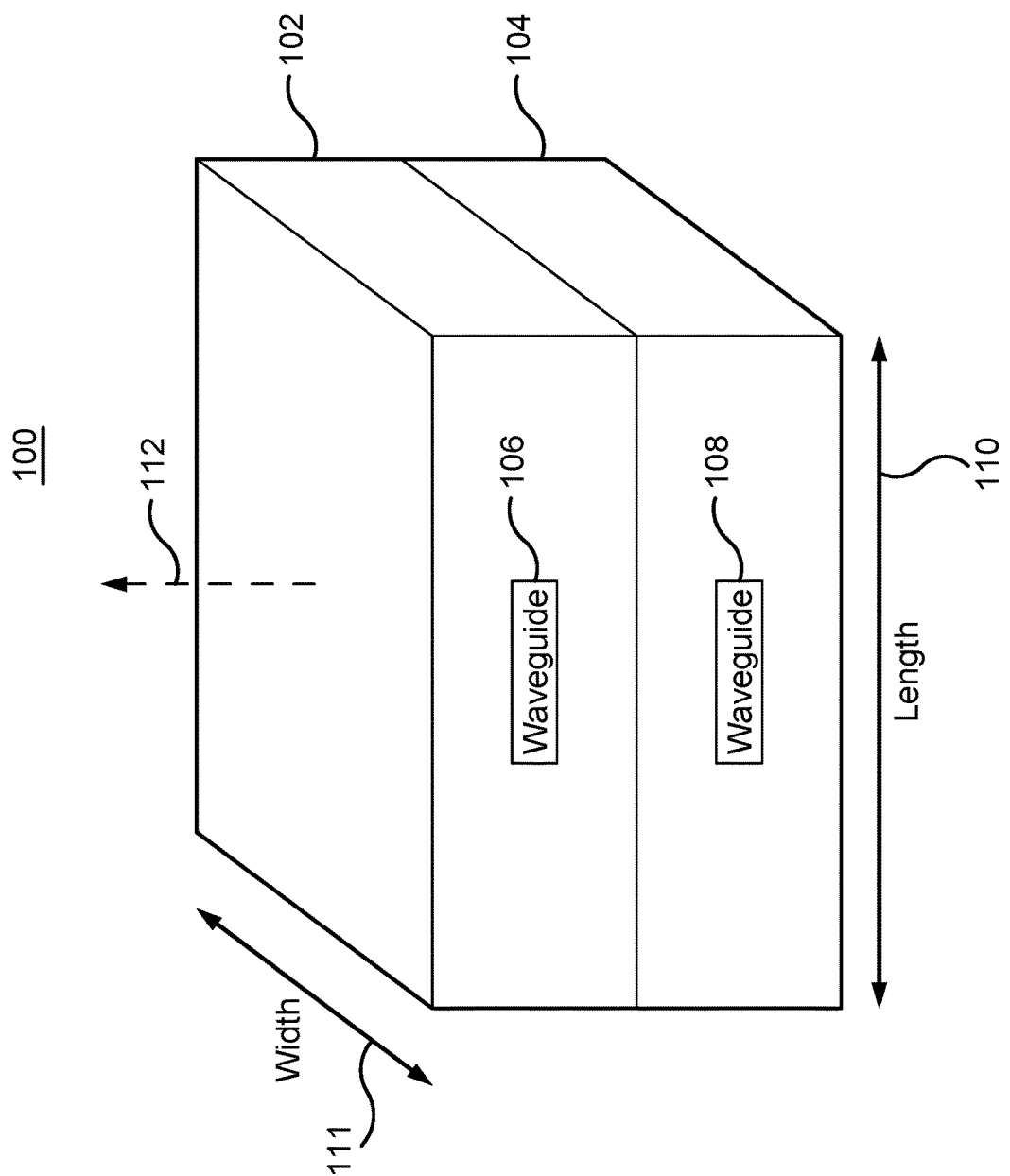
FIG. 1 illustrates an example system.

The present disclosure describes a crossover structure for an optical circuit and a method of operating the optical circuit. According to an embodiment, an optical circuit includes a first layer, a second layer, a first waveguide positioned in the first layer, and a second waveguide positioned in the second layer. The second waveguide includes a first section, a second section coupled to the first section at a first end of the second section, and a third section coupled to the second section at a second end of the second section. When viewed along an axis normal to the first layer and the second layer, the first section is positioned on a first side of the first waveguide, the third section is positioned on a second side of the first waveguide opposite the first side, and the second section overlaps with the first waveguide. A first rate of change of a first angle between the second section and the first waveguide varies across a length of the second section.

According to another embodiment, a method includes communicating a first optical signal through a first waveguide positioned in a first layer of an optical circuit and communicating a second optical signal through a second waveguide positioned in a second layer of the optical circuit. The second waveguide includes a first section, a second section coupled to the first section at a first end of the second section, and a third section coupled to the second section at a second end of the second section. When viewed along an axis normal to the first layer and the second layer, the first section is positioned on a first side of the first waveguide, the third section is positioned on a second side of the first waveguide opposite the first side, and the second section overlaps with the first waveguide. A first rate of change of a first angle between the second section and the first waveguide varies across a length of the second section.

According to another embodiment, an optical circuit includes a first waveguide and a second waveguide positioned beneath the first waveguide. The second waveguide includes a first section, a second section coupled to the first section at a first end of the second section, and a third section coupled to the second section at a second end of the second section. The first section is positioned on a first side of the first waveguide. The third section is positioned on a second side of the first waveguide opposite the first side. The second section overlaps with the first waveguide. A first rate of change of a first angle between the second section and the first waveguide varies across a length of the second section.

Example Embodiments

Optical waveguides may carry optical signals to different points in an optical circuit or system. Due to the arrangement of some optical circuits, the waveguides in the optical circuits may cross over or overlap each other to route optical signals to desired locations. For example, demultiplexers may produce a series of optical signals in a particular order. Waveguides carrying the optical signals may need to cross over each other to reorder the optical signals. These crossovers, however, may cause cross-talk (e.g., the optical signals in one waveguide may leak into another waveguide) resulting in optical loss.

The present disclosure describes a crossover structure in an optical circuit that reduces optical loss, in certain embodiments. Generally, the optical circuit includes two waveguides in two different layers, one layer positioned above the other layer. The first waveguide may extend horizontally or linearly across a layer. The second waveguide may cross over the first waveguide, but instead of crossing over at a point (as existing crossovers are structured), the second waveguide crosses over across a portion of the length of the second waveguide. As a result, the second waveguide may cross over the first waveguide slowly, rather than abruptly. The portion of the length of the second waveguide that forms the crossover structure slowly transition from one side of the first waveguide to the other side of the first waveguide. For example, an angle between the first waveguide and the second waveguide in this crossover region may vary slowly across the crossover region. As a result, the crossover structure reduces crosstalk between the waveguides, which reduces optical loss in certain embodiments.

FIG. 1 illustrates an example system 100. Generally, the system 100 may be an optical circuit or device. As seen in FIG. 1, the system 100 includes a layer 102, a layer 104, a waveguide 106, and a waveguide 108. In certain embodiments, the waveguide 108 is shaped and positioned such that the waveguide 108 slowly crosses over the waveguide 106 instead of abruptly crossing over the waveguide 106. The waveguide 108 cross over the waveguide 106 over a portion of the length of the waveguide 106, instead of crossing over the waveguide 106 at a point of the waveguide 108. At one point of the crossover region, the waveguide 108 may be parallel or collinear with the waveguide 106.

The layers 102 and 104 may be coupled to each other. In some embodiments, the layer 102 is positioned on the layer 104. In other embodiments, the layer 104 is positioned on the layer 102. The layers 102 and 104 may include any suitable material that physically supports the waveguides 106 and 108. For example, the layers 102 and 104 may be formed using an insulator material, a dielectric, a semiconductor material, etc. In some embodiments, the layers 102 and 104 have different refractive indexes. The layers 102 and 104 may have a length 110 and a width 111. The waveguides 106 and 108 may extend along the length 110 of the layers 102 and 104. Additionally, the layers 102 and 104 may have a normal 112. The normal 112 may be orthogonal to a surface of the layer 102 and a surface of the layer 104. Viewing the layers 102 and 104 along the normal 112 may produce a top-down view of the layers 102 and 104.

The waveguides 106 and 108 may carry optical signals through the layers 102 and 104. The waveguide 106 may be positioned or disposed within the layer 102. The waveguide 108 may be positioned or disposed in the layer 104. The waveguides 106 and 108 may extend along the length 110 of the layers 102 and 104. The waveguide 108 may extend horizontally or linearly across the length 110 of the layer 102. The waveguide 108 may cross over the waveguide 106 as the waveguide 108 extends along the length 110 of the layer 104. The crossover between the waveguide 106 and 108 may not be abrupt. Specifically, the waveguide 108 may cross over the waveguide 106 across a portion of the length of the waveguide 108. As a result, the waveguide 108 may slowly cross over the waveguide 106, which reduces optical crosstalk between the waveguides 106 and 108 in certain embodiments.

FIG. 2 illustrates an example layer 102 in the system 100 of FIG. 1. Specifically, FIG. 2 provides a top-down view of the layer 102 in the system 100. This top-down view may be produced by viewing the layer 102 along the normal 112. The layer 102 has been made transparent in the example of FIG. 2 to more clearly show the waveguide 106 in the layer 102. As seen in FIG. 2, the waveguide 106 is positioned within the layer 102. The waveguide 106 also extends across the length 110 of the layer 102. Specifically, the waveguide 106 extends linearly or horizontally across the length 110 of the layer 102. As a result, the waveguide 106 may carry optical signals linearly or horizontally across the length 110 of the layer 102.

Figure 3A:
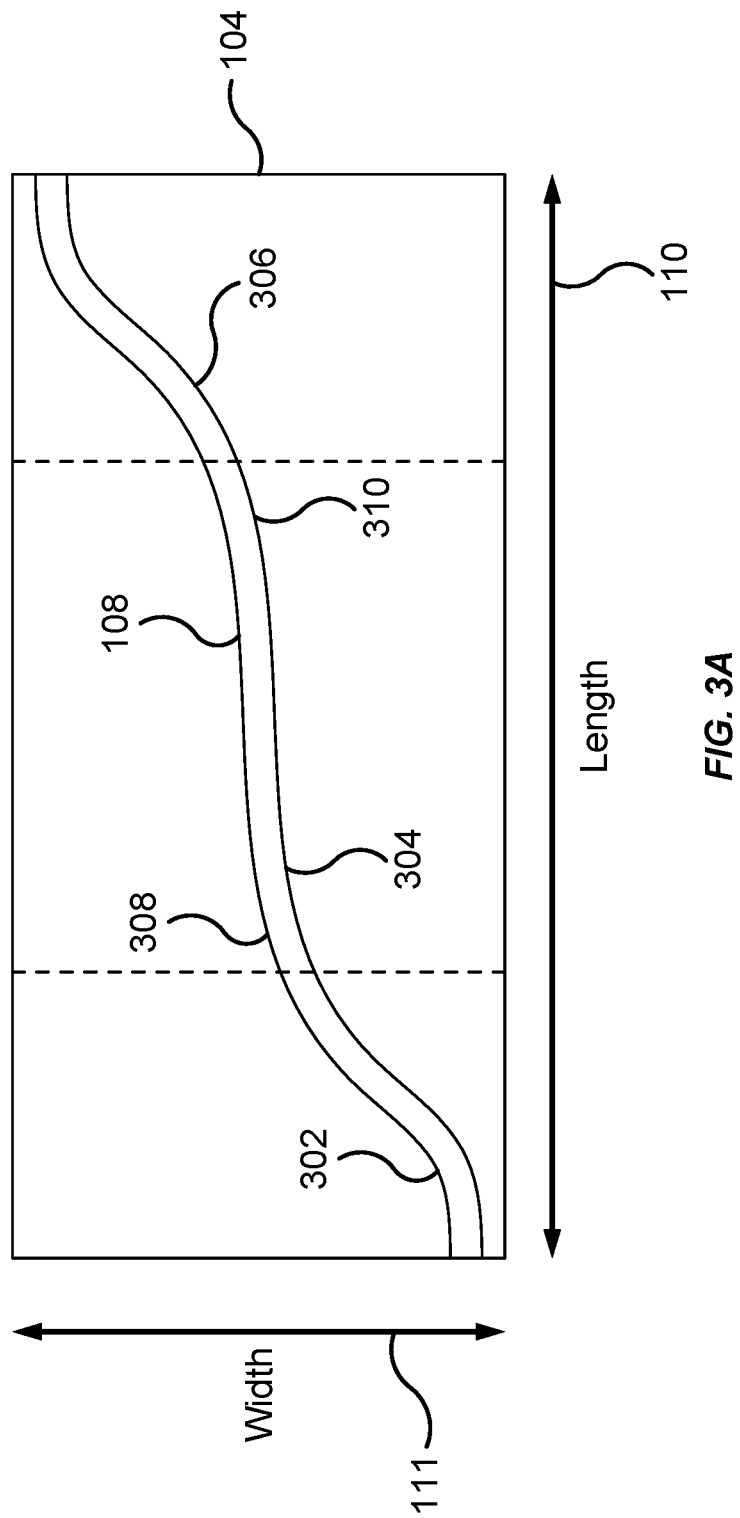
FIGS. 3A and 3B illustrate an example layer in the system of FIG. 1.
Figure 3B:
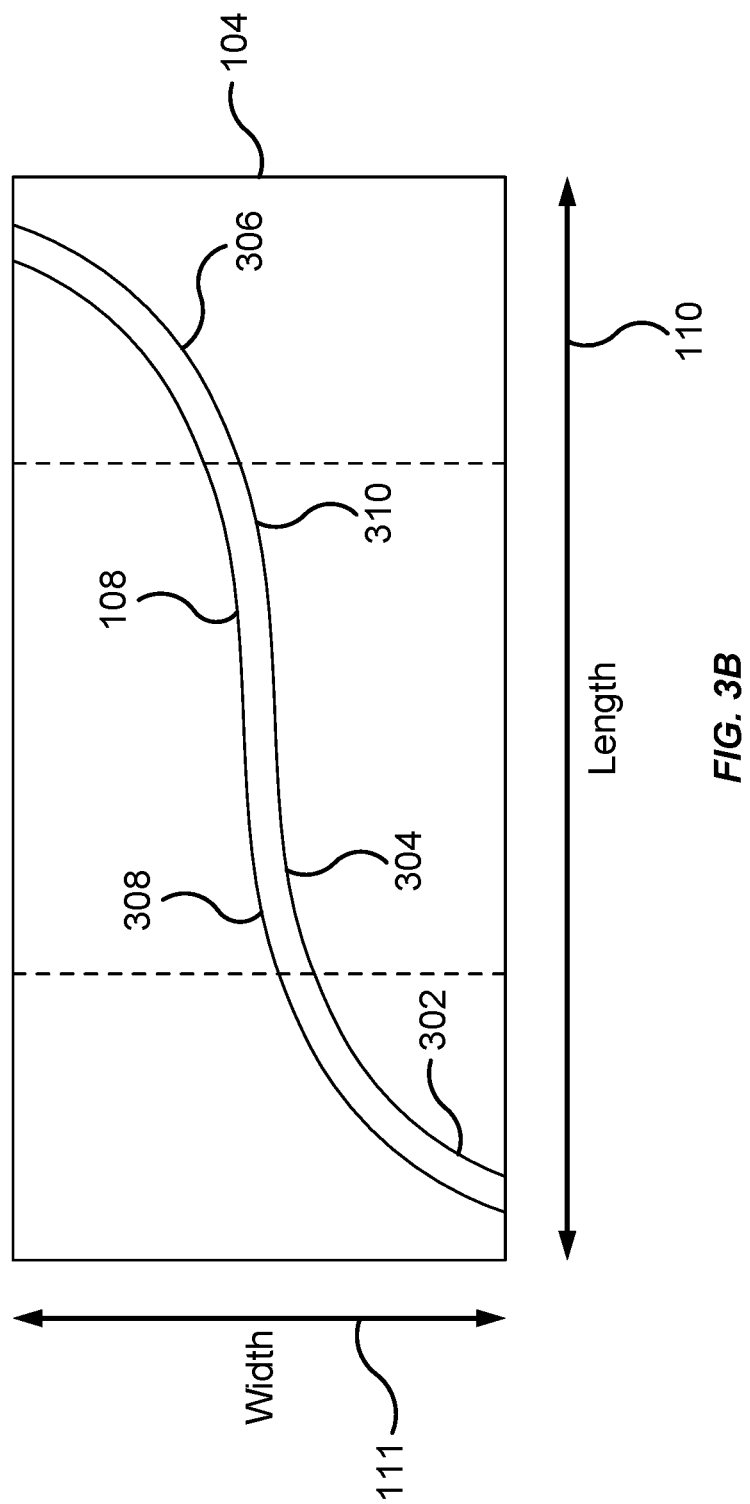

FIGS. 3A and 3B illustrate an example layer 104 in the system 100 of FIG. 1. Specifically, FIGS. 3A and 3B provide top-down views of the layer 104. These top-down views may be produced by viewing the layer 104 along the normal 112 of the system 100. The layer 104 has been made transparent in the examples of FIGS. 3A and 3B to more clearly show the waveguide 108 in the layer 104. As seen in FIGS. 3A and 3B, the waveguide 108 may be positioned or disposed in different configurations in the layer 104.

As seen in FIG. 3A, the waveguide 108 extends across the length 110 of the layer 104. The waveguide 108 may include sections 302, 304, and 306. The sections 302 and 306 may be attached to the section 304. The section 304 includes ends 308 and 310. The end 310 is at an opposite end of the section 304 as the end 308. The section 302 couples to the section 304 at the end 308. The section 306 couples to the section 304 at the end 310.

The sections 302 and 306 may include bends that direct the waveguide 108 towards the ends of the layer 104. The section 304 may slowly transition to connect to the sections 302 and 306. Specifically, the section 304 may include a portion that has a small slope in the direction of the width 111 across the length of the portion of the section 304. As a result, moving across the length of the section 304 may produce a small change in the direction along the width 111, relative to moving across the lengths of the sections 302 and 306.

FIG. 3B illustrates an alternative positioning of the waveguide 108 in the layer 104. As seen in FIG. 3B, the waveguide 108 may extend primarily along the length 110 of the layer 104. The sections 302 and 306 of the waveguide 108 may bend to be directed along the width 111 of the layer 104. As a result, the sections 302 and 306 bend such that the waveguide 108 extends across the width 111 of the layer 104 rather than the length 110 of the layer 104. The waveguide 108 still extends across a portion of the length 110 of the layer 104.

Like the example of FIG. 3A, the waveguide 108 in the example of FIG. 3B includes the section 304 that may have a small slope along the width 111 across a portion of the length of the section 304. As a result, moving across the section 304 may result in a small change in the position along the width 111 of the layer 104. Moving across the sections 302 and 306 may result in a large change in the position along the width 111 of the layer 104.

In both of the examples of FIGS. 3A and 3B, the section 304 may include portions that have a small slope in the direction of the width 111 of the layer 104. The magnitude of the slope may vary along the length of the portion of the section 304. Specifically, the portions of the sections 304 that are closer to the sections 302 and 306 may have a slope with a larger magnitude than the portions of the section 304 that are closer towards the middle of the section 304. As a result, the magnitude of the slope may decrease moving from the end 308 towards the middle of the section 304. Additionally, the magnitude of the slope may increase moving from the middle of the section 304 towards the end 310. In some embodiments, the magnitude of the slope near the middle of the section 304 may be zero. Stated differently, the section 304 may be horizontal and extend along the length 110 of the layer 104 near the middle of the section 304.

FIG. 4 illustrates an example top-down view of the system 100 of FIG. 1. The top-down view in FIG. 4 may be produced by viewing the system 100 along the normal 112. To better show the positioning of the waveguides 106 and 108, the layers 102 and 104 are not illustrated in the example of FIG. 4. As see in FIG. 4, the waveguides 106 and 108 cross over each other across the length 110 of the system 100. The waveguide 106 is arranged as in the example of FIG. 2, and the waveguide 108 is arranged as in the example of FIG. 3A. The positioning of the waveguides 106 and 108 may cause the waveguides 106 and 108 to cross over each other when viewed from the top-down.

As seen in FIG. 4, the waveguide 106 extends across the length 110 of the system 100. Specifically, the waveguide 106 may extend linearly or horizontally across the length 110 of the system 100. The waveguide 108 may be positioned beneath or above the waveguide 106. The waveguide 108 includes the sections 302, 304, and 306. The shape and structure of the sections 302, 304, and 306 may cause the waveguide 108 to cross over the waveguide 106. Specifically, the section 302 may be positioned on a first side of the waveguide 106, while the section 306 is positioned on an opposite side of the waveguide 106.

Moving across the section 302 towards the section 304, the section 302 may bend to move closer towards the waveguide 106. The angle between the section 302 and the waveguide 106 may decrease moving across the section 302 towards the section 304. Similarly, moving across the section 306 towards the section 304, the section 306 may bend to move closer towards the waveguide 106. The angle between the section 306 and the waveguide 106 may reduce moving across the section 306 towards the section 304.

The section 304 is where the waveguide 108 and the waveguide 106 cross over each other. As seen in FIG. 4, the shape and slope of the section 304 causes the section 304 to slowly cross over the waveguide 106 from one side of the waveguide 106 to an opposite side of the waveguide 106. Specifically, as seen in FIG. 4, the end 308 of the section 304 is positioned on an opposite side of the waveguide 106 as the end 310 of the section 304. Additionally, the slope of the section 304 produces the slow crossover with the waveguide 106. The angle between the section 304 and the waveguide 106 varies moving across the length of the section 304. The angle between the section 304 and the waveguide 106 is greatest at the ends 308 and 310. This angle decreases moving closer towards the midpoint 402. In some embodiments, the angle between the section 304 and the waveguide 106 at the midpoint 402 is zero, which means that the section 304 extends parallel or collinear with the waveguide 106 at the midpoint 402. In certain embodiments, the angle between the section 304 and the waveguide 106 is less than thirty degrees across the section 304.

Additionally, the angles between the section 302 and the waveguide 106 and the angles between the section 306 and the waveguide 106 vary across the lengths of the sections 302 and 306. The rate of change of the angle between the section 302 and the waveguide 106 and the rate of change of the angle between the section 306 and the waveguide 106 may be larger than the rate of change of the angle between the section 304 and the waveguide 106 moving across the length of the section 304.

Moving from the end 308 or 310 towards the midpoint 402, the section 304 may start by not overlapping with the waveguide 106 and then gradually begin overlapping the waveguide 106. Portions of the ends 308 and 310 may partially overlap the waveguide 106. Moving closer towards the midpoint 402, the section 304 may begin fully overlapping the waveguide 106.

As seen in FIG. 4, the slope of the section 304 causes the waveguide 108 to slowly cross over the waveguide 106. Specifically, the waveguide 106 and the waveguide 108 at least partially overlap across a substantial portion of the length of the section 304. This type of crossover is in contrast to existing optical devices, where waveguides cross over each other at a point or abruptly. In some embodiments, the slow cross over between the waveguide 108 and the waveguide 106 reduces optical crosstalk between the waveguide 106 and the waveguide 108, which reduces optical loss.

FIG. 5 illustrates an example top-down view of the system 100 of FIG. 1. This top-down view may be produced by viewing the system 100 along the normal 112. Similar to the example of FIG. 4, the layers 102 and 104 are not illustrated to show the crossover between the waveguides 106 and 108. The waveguide 106 is arranged as in the example of FIG. 2, and the waveguide 108 is arranged as in the example of FIG. 3B.

As seen in FIG. 5, the waveguide 106 extends linearly or horizontally across the length 110 of the system 100. The waveguide 108 also extends across a portion of the length 110 of the system 100. The waveguide 108 includes the sections 302, 304, and 306. Unlike the example of FIG. 4, the sections 302 and 306 bend towards the opposite ends of the width 111 of the system 100. The sections 302 and 306 may bend such that the angles between the sections 302 and 306 and the waveguide 106 exceed eighty degrees. As a result, the waveguide 108 may enter and exit the system 100 along a different direction than the waveguide 106. The bends in the sections 302 and 306 may begin outside of the crossover region between the waveguide 106 and the waveguide 108. As a result, the bends in the sections 302 and 306 may not result in a significant increase in crosstalk between the waveguide 106 and the waveguide 108.

Similar to the example of FIG. 4, the section 304 may slowly cross over the waveguide 106. Specifically, the slope and shape of the section 304 may cause the waveguide 108 to cross over the waveguide 106 across a portion of the length of the section 304. As seen in FIG. 5, moving from the end 308 towards the end 310, the section 304 may move closer towards the waveguide 106, and eventually overlap the waveguide 106. Specifically, moving from the end 308 or 310 towards the midpoint 402, the section 304 may start by not overlapping with the waveguide 106 and then gradually begin overlapping the waveguide 106. Portions of the ends 308 and 310 may partially overlap the waveguide 106. Moving closer towards the midpoint 402, the section 304 may begin fully overlapping the waveguide 106.

The section 304 may then cross over the waveguide 106 and move to an opposite side of the waveguide 106. As a result, the angle between the section 304 and the waveguide 106 may decrease moving from the end 308 towards the midpoint 402. This angle may increase moving from the midpoint 402 towards the end 310. In certain embodiments, the angle between the section 304 and the waveguide 106 is less than thirty degrees across the section 304. Additionally, as seen in FIG. 5, the angles between the section 302 and the waveguide 106 and the angles between the section 306 and the waveguide 106 vary across the lengths of the sections 302 and 306. The rate of change of the angle between the section 302 and the waveguide 106 and the rate of change of the angle between the section 306 and the waveguide 106 may be larger than the rate of change of the angle between the section 304 and the waveguide 106. As a result, the sections 302 and 306 may move away from the waveguide 106 at a more dramatic slope than the section 304.

Figure 6:
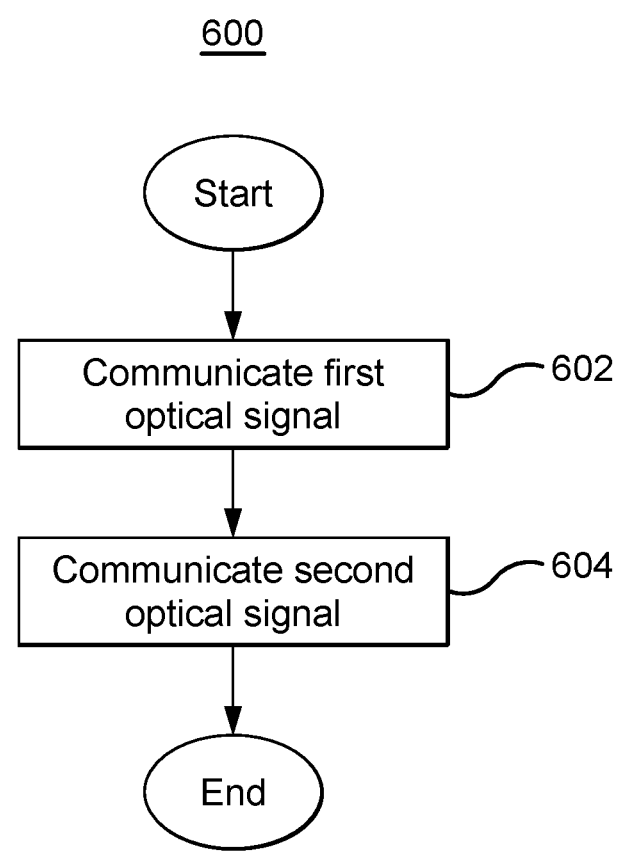
FIG. 6 is a flowchart of an example method performed in the system of FIG. 1.

FIG. 6 is a flowchart of an example method 600 performed in the system 100 of FIG. 1. In particular embodiments, the waveguides 106 and 108 may perform the steps of the method 600. The shape and structure of the waveguides 106 and 108 may reduce crosstalk between the waveguides 106 and 108. Specifically, the waveguide 108 may slowly cross over the waveguide 106, which may reduce optical leakage between the waveguides 106 and 108.

In block 602, the waveguide 106 communicates a first optical signal across the system 100. The waveguide 106 may extend horizontally or linearly across the length 110 of the layer 102. As a result, the first optical signal may be communicated linearly or horizontally across the length 110 of the layer 102.

In block 604, the waveguide 108 communicates a second optical signal through the system 100. The waveguide 108 may be positioned in the layer 104, which is positioned above or beneath the layer 102. The shape and positioning of the waveguide 108 may cause the waveguide 108 to cross over the waveguide 106 when viewed along the normal 112 of the layers 102 and 104. The waveguide 108 may include the sections 302, 304, and 306. The sections 302 and 306 may be attached to the ends 308 and 310 of the section 304. The section 304 may have a slope that causes the section 304 to slowly cross over the waveguide 106 across the length of the section 304. As a result, the sections 302 and 306 may be positioned on opposite sides of the waveguide 106.

In certain embodiments, the angle between the section 304 and the waveguide 106 may reduce moving from an end 308 or 310 of the section 304 towards the midpoint 402 of the section 304 or the waveguide 108. This angle may reduce to zero at the midpoint 402. As a result, the section 304 crosses over the waveguide 106 across the length of the section 304, rather than having an abrupt crossover at a point on the section 304. This crossover structure may reduce crosstalk between the waveguide 106 and the waveguide 108.

In summary, the system 100 includes two waveguides 106 and 108 in two different layers 102 and 104, one layer 102 positioned above the other layer 104. The first waveguide 106 may extend horizontally or linearly across the layer 102. The second waveguide 108 may cross over the first waveguide 106, but instead of crossing over at a point (as existing crossovers are structured), the second waveguide 108 crosses over across a portion of the length of the second waveguide 108. As a result, the second waveguide 108 may cross over the first waveguide 106 slowly, rather than abruptly. The portion of the length of the second waveguide 108 that forms the crossover structure slowly transition from one side of the first waveguide 106 to the other side of the first waveguide 106. For example, an angle between the first waveguide 106 and the second waveguide 108 in this crossover region may vary slowly across the crossover region. As a result, the crossover structure reduces crosstalk between the waveguides 106 and 108, which reduces optical loss in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

I claim:

1. An optical circuit comprising:
   a first layer;
   a second layer;
   a first waveguide positioned in the first layer; and
   a second waveguide positioned in the second layer, wherein the second waveguide comprises a first section, a second section coupled to the first section at a first end of the second section, and a third section coupled to the second section at a second end of the second section, and wherein, when viewed along an axis normal to the first layer and the second layer:
   the first section is positioned on a first side of the first waveguide;
   the third section is positioned on a second side of the first waveguide opposite the first side;
   the second section overlaps with the first waveguide, wherein a first rate of change of a first angle between the second section and the first waveguide varies across a length of the second section;
   a second rate of change of a second angle between the first section and the first waveguide varies across a length of the first section moving towards the second section; and
   the second rate of change is greater than first rate of change.

2. The optical circuit of claim 1, wherein the first layer is positioned on the second layer or the second layer is positioned on the first layer.

3. The optical circuit of claim 1, wherein:
   the first end of the second section is positioned on the first side of the first waveguide and partially overlaps the first waveguide; and
   the second end of the second section is positioned on the second side of the first waveguide and partially overlaps the first waveguide.

4. The optical circuit of claim 1, wherein a middle portion of the second section positioned between the first end and the second end is fully overlapped by the first waveguide.

5. The optical circuit of claim 1, wherein the first section bends such that a second angle between the first section and the first waveguide is greater than eighty degrees.

6. The optical circuit of claim 1, wherein the first angle remains less than thirty degrees across the length of the second section.

7. The optical circuit of claim 1, wherein the first layer and the second layer have different refractive indexes.

8. The optical circuit of claim 1, wherein the first waveguide extends parallel to a length of the first layer.

9. The optical circuit of claim 1, wherein the second section is parallel to the first waveguide at a midpoint of the first waveguide.

10. A method comprising:
    communicating a first optical signal through a first waveguide positioned in a first layer of an optical circuit;
    communicating a second optical signal through a second waveguide positioned in a second layer of the optical circuit, wherein the second waveguide comprises a first section, a second section coupled to the first section at a first end of the second section, and a third section coupled to the second section at a second end of the second section, and wherein, when viewed along an axis normal to the first layer and the second layer:
    the first section is positioned on a first side of the first waveguide;
    the third section is positioned on a second side of the first waveguide opposite the first side;
    the second section overlaps with the first waveguide, wherein a first rate of change of a first angle between the second section and the first waveguide varies across a length of the second section;

a second rate of change of a second angle between the first section and the first waveguide varies across a length of the first section moving towards the second section; and the second rate of change is greater than first rate of change.

11. The method of claim 10, wherein the first layer is positioned on the second layer or the second layer is positioned on the first layer.

12. The method of claim 10, wherein:
the first end of the second section is positioned on the first side of the first waveguide and partially overlaps the first waveguide; and
the second end of the second section is positioned on the second side of the first waveguide and partially overlaps the first waveguide.

13. The method of claim 10, wherein a middle portion of the second section positioned between the first end and the second end is fully overlapped by the first waveguide.

14. The method of claim 10, wherein the first section bends such that a second angle between the first section and the first waveguide is greater than eighty degrees.

15. The method of claim 10, wherein the first angle remains less than thirty degrees across the length of the second section.

16. An optical circuit comprising:
a first waveguide; and
a second waveguide positioned beneath the first waveguide, wherein the second waveguide comprises a first section, a second section coupled to the first section at a first end of the second section, and a third section coupled to the second section at a second end of the second section, and wherein:
the first section is positioned on a first side of the first waveguide;
the third section is positioned on a second side of the first waveguide opposite the first side;
the second section overlaps with the first waveguide, wherein a first rate of change of a first angle between the second section and the first waveguide varies across a length of the second section;
a second rate of change of a second angle between the first section and the first waveguide varies across a length of the first section moving towards the second section; and
the second rate of change is greater than first rate of change.

* * * * *